United States Patent [19]

Allred et al.

[11] 4,074,120

[45] Feb. 14, 1978

[54] AUTOMATED MATERIALS STORAGE SYSTEM AND METHOD

[75] Inventors: James Kenneth Allred; Arlyn G. Liddell, both of Salt Lake City; Edward Barney Quinn, Bountiful; Francis Bischoff Black, Sandy, all of Utah

[73] Assignee: Kenway Incorporated, Bountiful, Utah

[21] Appl. No.: 663,177

[22] Filed: Mar. 2, 1976

[51] Int. Cl.² .................. B65G 47/00; G06K 7/10
[52] U.S. Cl. ........................... 235/419; 214/16.4 A
[58] Field of Search ............ 214/16.4 A; 235/61.7 R, 235/61.11 E, 61.11 D, 61.11 R, 61.6 R, 150.2; 340/152, 149 A

[56] References Cited

U.S. PATENT DOCUMENTS

| | | | |
|---|---|---|---|
| 3,049,247 | 8/1962 | Lemelson | 214/16.4 A |
| 3,402,836 | 9/1968 | Debrey | 214/16.4 A |
| 3,480,162 | 11/1969 | Saul | 214/16.4 A |
| 3,719,287 | 3/1973 | Billingsley | 214/16.4 A |
| 3,734,311 | 5/1973 | Thompson | 214/16.4 A |
| 3,958,102 | 5/1976 | Burt | 235/61.11 E |

OTHER PUBLICATIONS

"Six Hundred Products into 10,000 Slots" *Mechanical Handling,* Nov. 1970; London, England, pp. 49–51.
"Pan Am's Dynamic Supply System" *Modern Materials Handling* (USA), vol. 27, No. 11, Nov. 1972, pp. 64–69.

*Primary Examiner*—Robert M. Kilgore
*Attorney, Agent, or Firm*—H. Ross Workman; J. Winslow Young

[57] ABSTRACT

A system and method for automatically storing and retrieving loads of materials from a high-rise storage warehouse including providing for electronic identification of materials at a remote storage operator station and thereafter activating a CPU to (a) electronically verify the acceptability of the materials, (b) assign a transaction code to the data bit representation of the identification of the load, and (c) select an address in the high-rise storage warehouse for the load. The load is accompanied by the transaction code in machine-readable form and then moved to a pickup station adjacent the high-rise storage warehouse. Proper alignment of the load is then electronically verified and the transaction code is communicated to the CPU to identify which materials are on the pickup station. A storage-retrieval (S/R) machine is dispatched at the command of the CPU to move the load to its CPU-assigned address in the high-rise storage warehouse. In retrieving the goods, a request is entered at the storage operator station and the CPU scans all inventory to identify materials which will match the request. Then the CPU identifies the address in the high-rise storage warehouse of the requested materials and dispatches the S/R machine to retrieve the materials and place the load upon the pickup station.

As soon as a lift truck is available to remove the load, the CPU is asked for a move-ticket which is then printed in man-readable form by the CPU, the move-ticket identifying the pickup and deposit station where the load is located and such other information as may be desirable. When the load is taken from the pickup and deposit station, the load description is deleted from CPU memory automatically.

20 Claims, 5 Drawing Figures

AUTOMATED MATERIALS STORAGE SYSTEM AND METHOD

BACKGROUND

1. Field of the Invention

This invention relates to automated materials storage systems and methods and more particularly to a system and method for storing and retrieving unit storage loads through utilization of computer-controlled in-processing and out-processing.

2. The Prior Art

The problems with materials handling are well known in the art. Particularly where the conventional warehousing and storge systems are used, it is common for a forklift or the like to move materials from a truck or train dock into a warehouse where the goods are stored in an area generally designated for the type of goods received. The storage location of the goods is dependent upon the availability of warehousing space and accessibility requirements. It is well known that this technique consumes an enormous amount of time, space and records. It is also well known that this system tends to create many errors in the retrieval of goods.

Even where mechanized warehousing systems are used, it is conventional for a variety of lift truck drivers to each assume the responsibility for identifying the goods to be stored and for placing the thus identified goods into the mechanized storage system. Using a number of people to perform the identification function significantly increases the risk that the goods will be erroneously identified and stored in an improper location. Subsequently, when retrieval of the goods is attempted, they cannot be found.

Through conventional prior art systems, it is also well known that a single pickup and deposit station cannot be used both for input and output of goods from the storage warehouse because of the high risk that incoming and outgoing goods will be confused and mixed up.

BRIEF SUMMARY AND OBJECTS OF THE INVENTION

The present invention significantly advances the art of automated high-rise storage systems by combining the accuracy of computerized management of materials handling with the utility and lower cost of forklift trucks for moving materials to and from the high-rise storage area.

The high incidence of error in describing goods being stored in the system is avoided in the present invention by providing for identification and description of the goods by a specialized operator at a control location, the description being transmitted to a computer whereupon a transaction code is identified to the goods. A physical ticket bearing the transaction code accompanies the goods in transit. The goods are accepted for storage only when the transaction code is submitted to the computer for acceptance. Goods are retrieved from storage upon request from a specialized operator and the computer keeps track of the goods and issues instructions to pick up the goods at a specified pickup station thereby minimizing risk of human error in obtaining the goods.

It is, therefore, a primary object of the present invention to provide an improved system and method for identifying, storing and retrieving goods with a minimum of human error.

It is another primary object of the present invention to provide the accuracy of a computer-managed storage system while retaining the lower cost and utility of using forklift trucks to and from the high-rise storage area.

It is another valuable object of the present invention to provide efficient computer management of materials flow into and out of a high-rise storage system.

Another valuable object of the present invention is to provide a novel and useful method whereby the need for separate input and output stations is eliminated.

It is another valuable object of the present invention to provide system and method for generating a transaction code in machine-readable form to accompany goods in transit to a high-rise storage warehouse.

Another object of the present invention is to provide system and method for verifying alignment of the load of goods prior to storage in the high-rise warehouse.

One still further valuable object of the present invention is to provide system and apparatus for storing a library of descriptions of acceptable goods and comparing each load of incoming goods with the library to determine the acceptability of the incoming goods.

Another object of the present invention is to provide system and method for electronically ascertaining the status of goods, whether incoming or outgoing to permit a single station to be used for receiving and discharging goods.

It is another object of the present invention to provide system and method for electronically preparing instructions for the pickup of ordered goods at a specified location as the goods become available for pickup.

These and other objects and features of the present invention will become more fully apparent from the following description and appended claims taken in conjunction with the accompanying drawing.

DETAILED DESCRIPTION OF THE PREFERRED EMBODIMENTS

Reference is now made to figures illustrating presently preferred embodiments of the system and the method of the invention.

THE AUTOMATED WAREHOUSING SYSTEM

Until relatively recent times, inefficiency in areas where goods were warehoused and stored was grudgingly accepted. Picking errors, pilferage, slow service, wasted space, and employee turnover were simply regarded as inherent characteristics of warehouse operations, large and small.

More recently, however, automated pallet storage has been used to improve space utilization, inventory control, production speedup and efficiency. A pallet storage system, sometimes referred to as a unit load system, is characterized by its capacity to store and retrieve a load of goods 29 as a single unit. In this specification, the unit load of goods 29 may be a single container or a pallet upon which one or more containers of goods are stacked. This system is distinguished from a small parts storage system where parts are placed in an open bin which is stocked and picked as required.

Figure 1:
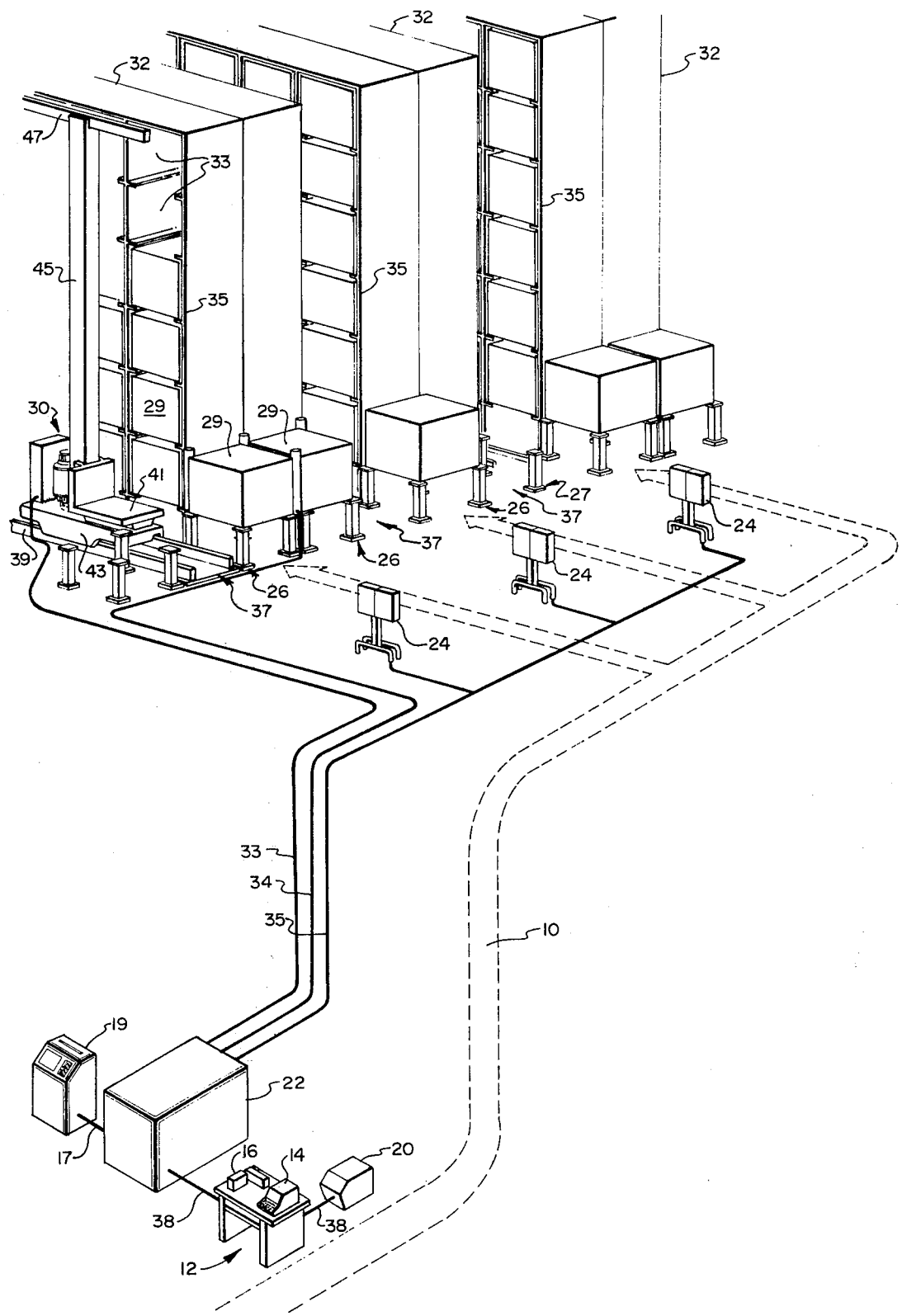
FIG. 1 is a schematic diagram illustrating a high-rise storage system embodiment of the present invention.

A modified unit load system comprises part of the illustrated embodiment of the present invention schematically illustrated in FIG. 1. With reference to FIG. 1, a high-rise storage warehouse assembly 32 is schematically illustrated. The high-rise storage assembly 32 comprises an array of vertically stacked bays 33. Each bay is arranged in a horizontal tier. Each bay 33 corresponds to a computer address representing its location in the high-rise storage assembly 32. Each high-rise storage assembly 32 is mounted back-to-back with another similar high-rise storage assembly 32 so as to face outwardly. Accordingly, the face 35 of each high-rise storage assembly 32 projects toward an aisle generally designated 37.

A storage-retrieval (S/R) machine generally designated 30 is mounted upon tracks schematically illustrated at 39 for longitudinal movement up and down each aisle 37. For ease of illustration, only one S/R machine is illustrated in FIG. 1. The S/R machine has a chassis 43 with wheels (not shown) which engage the tracks 39. An upstanding mast 45 is mounted upon the chassis and is typically associated with an overhead guide rail 47. A lift plate shuttle 41 is mounted upon the mast 45 and is vertically movable thereon. As will be hereinafter more fully described, the S/R machine is electronically commanded to move to an address in the high-rise storage 32 and moves up and down the aisles 37 to the addressed vertical array whereupon the lift plate shuttle 41 is elevated to the addressed tier. The lift plate shuttle then automatically moves the unit load of goods 29 into or out of the appropriate bay 33 upon command. Representative of the apparatus accomplishing the described result are U.S. Pat. Nos. 3,632,001 and 3,784,791, herein incorporated by reference.

With continued reference to FIG. 1, each high-rise storage assembly 32 is provided with a pickup and delivery station (P and D station) generally designated 26 and 27. In the embodiment illustrated in FIG. 1, P and D stations 26 are shown with a unit load 29 thereon while P and D stations 27 are illustrated empty. The P and D stations employed with the presently preferred embodiment of the invention are more fully illustrated in FIG. 2 and will be hereinafter more fully described.

The S/R machine 30 has the capacity to remove the unit load 29 from either of the P and D stations on the right or left of the aisle 37. Typically, the S/R machine will remove a load from one P and D station, take the load to its computer-assigned address in the high-rise storage assembly 32 and deposit the load in the appropriate bay 33. An order for a load stored in another bay 33 in the high-rise storage assembly 32 will be communicated to the S/R machine which will retrieve the ordered load and return it to the empty P and D station. A suitable S/R machine which will perform the described tasks is manufactured by Kenway Inc. of Salt Lake City, Utah under the name Kenway Unit Load S/R Machine.

In the embodiment of FIG. 1, an aisle input-output terminal (I/O terminal) 24 is located in each aisle 37. Each aisle terminal 24, each P and D station 26 or 27 and each S/R machine 30 is connected to a central computer (CPU) 22 through electrical cables 33-35. Furthermore, the CPU 22 is connected by an electrical cable 38 to a station operator console generally designated 12. The operator station 12 is equipped with a conventional computer terminal 14 comprising a keyboard and cathode-ray tube (CRT), a card reader 16 and a ticket printer 20. A line printer 19, connected through cable 17 has also been found desirable. The line printer 19 makes possible a variety of management reports concerning the goods in storage and transit. For example, it may be desirable to print reports on the quantity of goods in storage, age of goods and utilization of equipment. Also of interest is the location of empty storage bays, the content of each bay, receipts and disbursals and a list of part numbers or description of materials in storage. The printer 19 is preferable on line with the CPU and may be controlled through the terminal 14 or time initiated, as desired, to print selected contents of the CPU memory 40, hereinafter more fully described.

Figure 3:
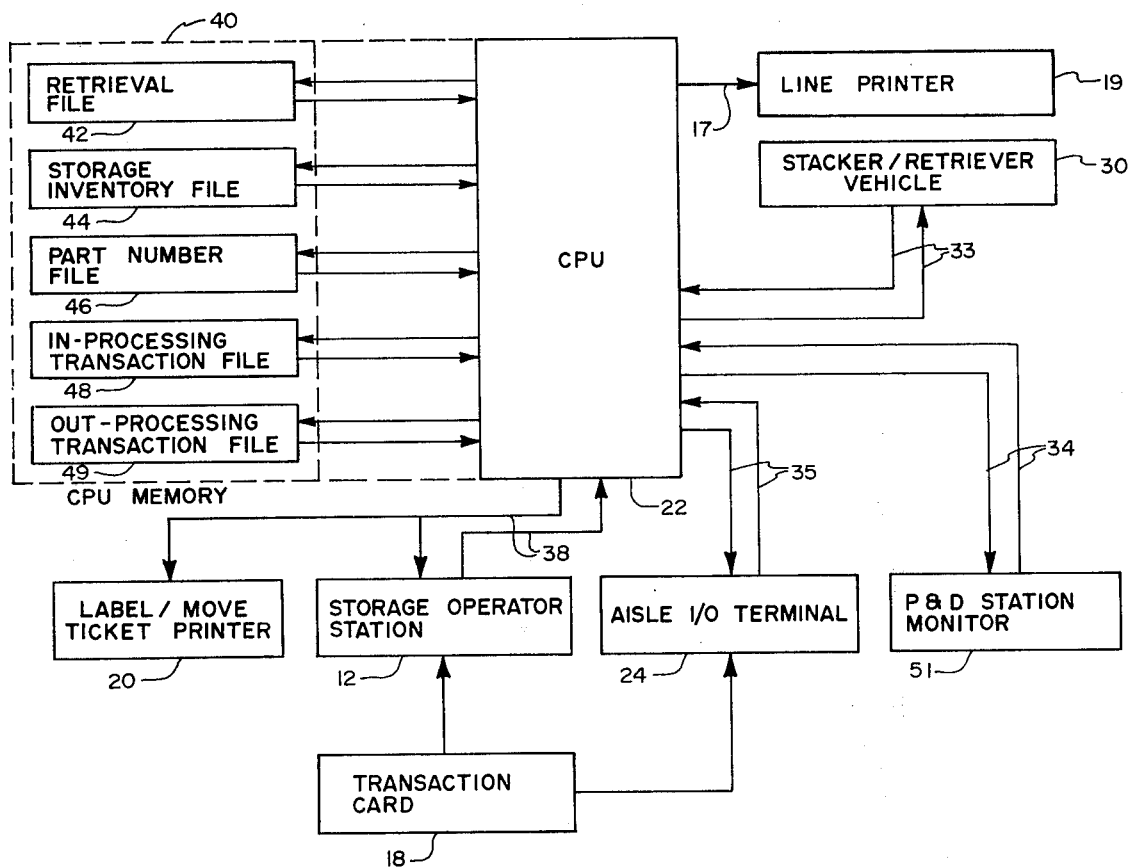
FIG. 3 is a block diagram illustrating the interaction of the components of the system.

The interaction of the CPU with the various peripheral devices and the purpose of each of the peripheral devices is best understood by reference to FIG. 3.

The storage operator station 12 provides one central location where a single skilled operator can electronically enter information describing incoming or outgoing material to the CPU 22. The CPU 22 has a memory 40 having segregated files, for convenience designated retrieval file 42, storage inventory file 44, part number file 46, in-processing transaction file 48 and out-processing transaction file 49. The files 42, 44, 46, 48 and 49 in memory 40 are used by the CPU in identifying and keeping track of the physical location of the goods while both in storage and in transit into or out of the high-rise storage warehouse 32. The part number file 46 contains an established listing of descriptions of goods, such as part numbers of all goods acceptable for storage within the high-rise storage warehouse 32. This file 46 is used by the CPU in comparing and verifying the correctness of part numbers or other descriptions entered at the storage operator station 12. The transaction files 48 and 49 are used by the CPU to keep track of which goods are in transit, either coming into or going out of the high-rise storage assembly 32, by storing information describing which goods are on the pickup and deposit station 26 at any given time. The storage inventory file 44 contains a listing and the computer-assigned addresses of all goods in storage within the high-rise storage assembly 32. The retrieval file 42 includes a queue used by the CPU to temporarily store information describing orders for outgoing goods.

The CPU compares the information stored in the retrieval file 42 with the information in the storage inventory file 44 in determining whether the order can be filled from the inventory on hand. The label and move-ticket printer 20 is a device through which the CPU can print, in man-readable form, labels to be attached to the goods or instructions for picking up goods at assigned pickup stations. Goods in transit can be identified by the CPU at the operator station 12 by assigned transaction cards 18. The code carried by the cards 18 being recognized when transmitted from an aisle I/O terminal 24. The aisle I/O terminal 24 provides a way in which the CPU is informed of the transaction code of the goods located on the P and D station for pickup. The P and D station monitor generally designated 51 (see also FIG. 2) monitors the availability of pickup and deposite stations and the alignment of loads on the station and communicates the monitored information to the CPU. Finally, the CPU controls the physical storage or retrieval of goods from the high-rise storage units 32 with the S/R machine 30. Having described the purpose of the various peripheral devices utilized within the automated storage system, attention is now turned to the method and preferred mode of operation of the system.

IN-PROCESSING AND STORAGE

Figure 4:
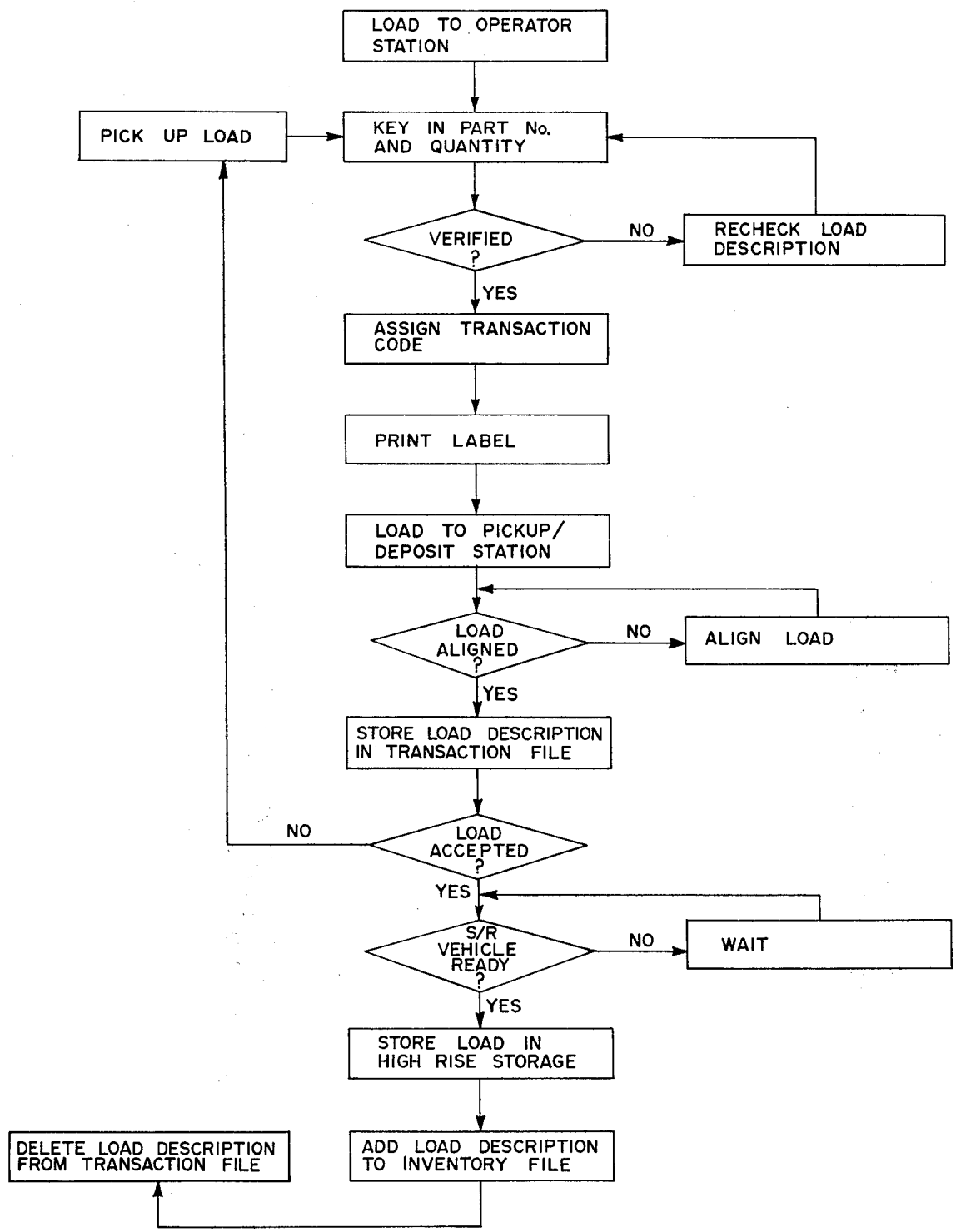
FIG. 4 is a flow chart illustrating the method used for in-processing and storage of material.

The broken-line path 10 represents the general movement of the materials by forklift operators. The method for in-processing and storage begins when a forklift operator brings a load of materials to the operator station 12. Of course, any suitable mode of transporting the goods other than with forklifts could be used. Referring now to FIGS. 3 and 4, a trained storage operator will examine goods brought to the storage operator station 12 by the forklift driver (not shown) and the operator will enter information such as the part number and quantity of the goods or materials into the CPU from the CRT keyboard 14 at the operator station 12. one of the principal problems encountered in materials handling relates to entering the wrong description of materials into the CPU 22 at the storage operator station. Entry of the wrong description or part number through inadvertence will make subsequent retrieval of the goods difficult or impossible because the computer will remember the goods only as they have been incorrectly described to the CPU 22. In order to minimize the potential error in describing the goods to the CPU, the CPU is provided with a part number file 46 as part of the CPU memory. The part number file 46 contains a permanent listing of all part numbers or other suitable description of acceptable mateials to be stored in the high-rise warehouse 32.

When the trained storage operator enters the part number and quantity of goods brought to the storage operator station 12 into the CPU 22, the CPU will compare the submitted part number with the part numbers listed in the part number file 46 of the CPU memory 40. If the part number received from the operator station 12 does not match any number in the list stored in file 46, the CPU 22 will send to the operator station 12 a request that the part number of the incoming materials be rechecked. If the part number received from the operator station 12 matches a description found in the file 46, the CPU will then accept a transaction code for assignment to the load of goods.

In order to uniquely identify the described goods to the CPU in the illustrated embodiment, a transaction card 18 is fed into the card reader 16 which in turn enters a transaction code into the in-processing file 48 of CPU 22. The transaction code associated with the goods identified to the CPU 22 permits the CPU 22 to store the precise description of the goods without human error at the time the goods are accepted by the S/R machine. Human error is eliminated by transmitting the transaction code from the aisle I/O terminal 24 to the CPU 22 at the time the goods are accepted by the S/R machine 30. Note that no human interpretation of the goods description is necessary at the P and D station 26. Significantly, error in transmitting the transaction code to the CPU is minimized by obtaining the code in machine-readable form at the storage operator station 12 and physically associating the code with the goods prior to movement of the goods along the path 10 (FIG. 1) to the pickup and deposite station 26.

Alternatively, error in transmitting the transaction code may be minimized by printing the code in man-readable form and including as part of the code at least one check digit. The check digit technique is a well-known method of verifying the accuracy of a particular number sequence. The check digit may, for example, be electronically verified from a mathematical operation on the transaction code. When the code has been transmitted, the CPU 22 can verify the accuracy of the transaction code by performing the mathematical operation and comparing the result thereof with the check digit.

The assignment of the transaction code could be accomplished in any one of several alternative ways. For example, the CPU may select a number from the in-processing transaction file 48 and print the code on a transaction card at the storage operator station 12 (FIG. 1). The transaction code is then stored in the transaction number file 48 of the CPU memory 22 (FIG. 3). The transaction code is later used to identify the load while it is still is transit before being stored. At this point it should be noted that the transaction code assigned to a given load can only be assigned at the storage operator station 12. This eliminates the need for more than one skilled operator. Furthermore, the transaction code is only assigned after the CPU 22 has verified and identified the incoming goods. This will greatly reduce the possibility of incorrectly identifying the goods at the P and D station 26 as will be hereinafter more fully described, since a forklift operator merely reenters the assigned transaction code which the CPU uses to automatically identify the goods waiting at the P and D station 26.

After the CPU 22 has associated the transaction code with the load of goods in memory 40, a physical form of the transaction code is attached to the load of goods as described above. This attachment may, for example, include placing the transaction card 18 with the goods. The card may, if desired, be secured by taping, tying or otherwise suitably attaching the card to the load 29. Alternatively, it may be desirable to have the CPU 22 print a transaction code from the file 48. The CPU then causes the ticket printer (not shown) at the storage operator station 12 to generate a man-readable label which is secured to the load. This label may include descriptive information in man-readable form to enable personnel to read the part number and quantity of material on the load. The load 29, with both the label and the transaction card is next moved in the general direction of path 10 (shown in FIG. 1) by a forklift operator to a pickup and deposit station 26.

Figure 2:
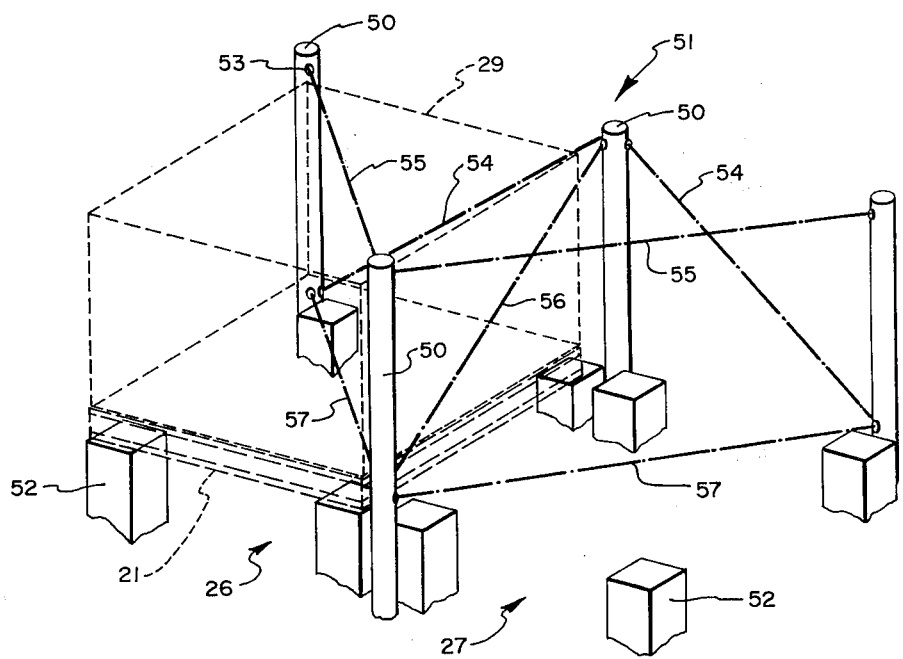
FIG. 2 is a schematic perspective illustration of one suitable embodiment of a pickup and deposit station and monitor.

Pickup and deposit stations 26 and 27 are illustrated in FIG. 1. A more schematic representation of the pickup and deposit stations are illustrated in FIG. 2. Referring now to FIG. 2, it is observed that each pickup and deposit station 26 has four load supports 52 spaced so as to receive a pallet 21 illustrated in broken lines in FIG. 2. If desired, the supports 52 may be provided with flanges (not shown) which guide the pallet 21 toward an alignment position as the pallet 21 is lowered upon the supports 52. The pallet 21 is illustrated as supporting a load 29 also illustrated in broken lines.

Desirably, the pickup and deposit station 26 is provided with an alignment verification and pickup and delivery station monitor system generally designated 51. The purpose for the monitor 51 is to ensure that the load 29 will fit properly into the bays 33 (FIG. 1) when the load 29 is inserted therein by the S/R machine 30. The pallet 21 is selected to be the appropriate size to fit within the bays 33. Accordingly, it is of primary concern that the load 29 not exceed the height of the bay 33 and that the load not be twisted on the pallet 21 so that a corner of the load would catch as the load is inserted into the bay. The alignment verification system 51 is an example of a suitable structure for detecting the described alignment difficulties.

Each alignment verification system 51 has three vertical cylindrical posts 50 which contain photocells 53. When two P and D stations are side by side, the alignment system 51 can cover both with four posts 50 as illustrated in FIG. 2. The photocells 52 are positioned in such a manner that if the load is twisted at an angle or if the load is too tall the light beams produced by the photocells will be interrupted, thereby generating a signal which is communicated to the CPU and notifying the CPU that the load is improperly aligned. Alignment of the load 29 is verified by creating a light beam 54 diagonally along the back of the load 29 between opposed photocells 53. A similar light beam 56 traverses the side of the load 29 diagonally between opposed photocells 53. If the load is twisted or otherwise improperly aligned, at least one of the light beams 54 or 56 will be broken by the load. The broken light beam will be detected by the P and D station monitor 51 (FIG. 3) and the misalignment communicated to the CPU 22. A light beam 55 traverses the top of the load 29 from corner to corner as illustrated in FIG. 2. If the light beam 55 is broken, the P and D station monitor 51 (FIG. 3) will communicate to the CPU that the load is too tall to be received in the bays 33.

If the load of goods 29 is made up of a plurality of stacked packages, the described diagonal light beams 54 and 56 may be inadequate to detect a package protruding undesirably from the load. Accordingly, it may be desirable to substitute the illustrated diagonal light beams with a plurality of parallel beams which form a light curtain for detecting protruding packages.

The pickup and delivery station 26 is also provided with structure for sensing the presence of the load 29 and pallet 21 on the pickup and delivery station. It is particularly important that the CPU be apprised of the presence or absence of goods 29 at the pickup and delivery station so that the CPU can direct the S/R machine 30 as to whether a load is to be picked up or delivered at the particular station. The presence of the pallet 21 and load 29 is detected by light beam 57 diagonally directed across the load 29 at pallet-height between opposed posts 50. The height of the beam 57 is selected so that if a pallet is brought to rest upon the supports 52, the beam will be broken and the P and D station monitor 51 will communicate the presence of the load 29 on the particular P and D station to the CPU 22. If the beam is not broken, as illustrated on the right side of FIG. 2, the CPU is instructed that the pickup and delivery station is available for deposit of goods 29.

If the goods 29 have been placed upon the station 26 but the alignment is improper either because the goods are twisted on the station 26 or because the height of the goods exceeds the acceptable limit, the CPU will cause a signal to be sent to the aisle I/O terminal 24 instructing the forklift operator to realign the load upon the station 26 or to shorten the load, as required.

After the proper alignment of a load has been verified, the forklift operator inserts the transaction card bearing a machine-readable code into the aisle terminal 24. If the code is in man-readable form, the code is manually entered into the I/O terminal 24. The CPU then searches the transaction file 48 of the CPU memory until it finds the proper transaction code. Since this transaction code was previously associated with the part number and quantity of goods to be stored at the operator station, the CPU automatically knows the part number and quantity of the goods at the pickup and deposit station 26. If for some reason the CPU is unable to find the transaction code in the transaction file 48 of the CPU memory 40 which was entered at the aisle terminal 24, the CPU returns a message to the aisle terminal requesting that the load be returned to the operator station 12.

After the transaction number entered at the aisle terminal 24 has been properly identified by the CPU 22 as resident in its transaction file 48, the CPU then monitors the availability of the S/R machines 30. If there are no S/R machines 30 available, the CPU holds the information for a predetermined length of time and then rechecks availability. As soon as the S/R machine 30 is available, the CPU 22 automatically commands the S/R machine 30 to pick up the load 29 and store it at a CPU-selected bay 33 within the high-rise warehouse 32. When the S/R machine 30 has completed storing the load 29 within the bay 33, the CPU 22 then stores the load description including part number and quantity in the storage inventory file 44. Since the information pertaining to part number and quantity has now been entered into the storage inventory file 44, which is a listing of all goods stored within the system, the transaction number is then deleted from the information of the stored goods 29 so that the number may be reassigned to another incoming load of materials.

Several advantages of the automatic high-rise system and in-processing and storage method described above should be noted. For example, the need for highly skilled operators is minimized through the use of one central operator station 12 from which all goods 29 are processed into and out of the automatic high-rise storage 32. Furthermore, the potential error for mislabeling or retrieving the wrong materials is minimized through the use of transaction codes and the transaction file 48 contained in the CPU memory 40. Since the transaction code is associated with the load of materials only at one location (i.e. the operator station 12) and since the transaction code is in machine-readable or check digit man-readable form and only assigned to the goods 29 after the goods 29 have properly been identified, the incoming materials cannot be improperly identified to the CPU at the pickup and deposit station 26. This serves to ensure that when a load of materials is placed at a deposit station 26 to be stored in the high-rise warehouse 32 and the transaction code is entered into the CPU from the aisle terminal 24, the CPU will know what materials are on that deposit station so that it can properly direct the S/R machine 30 in storing those materials at the CPU-assigned address.

OUT-PROCESSING AND RETRIEVAL

Figure 5:
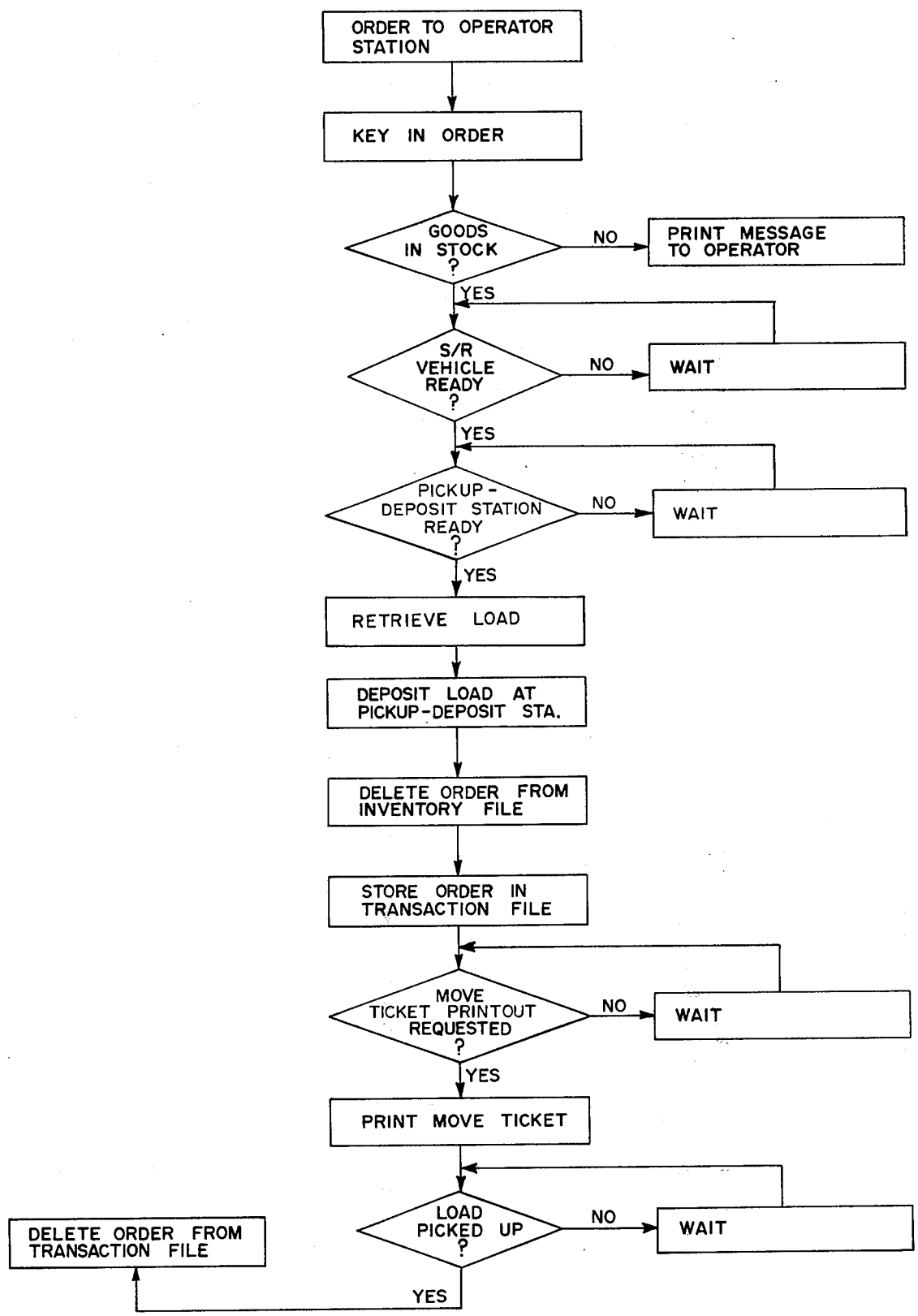
FIG. 5 is a flow chart illustrating the method used for retrieval and out-processing of material.

Attention is now directed to FIG. 3 in conjunction with FIG. 5 relative to out-processing and retrieval of load 29 of materials from the automatic high-rise storage system 32. An order for materials to be shipped is first sent to the operator station 12 (FIGS. 1 and 3). Information, e.g. describing the part number, quantity of materials required and destination is then sent to the CPU 22 by means of the computer terminal keyboard 14 at the operator station 12 (FIG. 1). Alternatively, orders may be communicated to the CPU with one or more cards with the required order information punched thereon or by magnetic tape or other commonly used computer generated or machine-readable media. The CPU then searches the storage inventory file 44 (FIG. 3) of the CPU memory 40 which contains a listing of all materials stored in the high-rise warehouse 32.

If the CPU is unable to fully satisfy the order as requested from the operator station 12, the CPU returns a message to the operator station by means of the CRt 14 stating that the order as requested cannot be filled. However, if the CPU is able to locate in the storage inventory file 44 the goods meeting the requested order, the CPU then checks to see whether an S/R machine 30 is available to retrieve the materials. If a machine 30 is not available, the CPU holds the information in a queue for a predetermined length of time and then rechecks availability. When an S/R machine 30 is available, the CPU 22 next determines whether or not a pickup and deposit station 26 or 27 is available. This is determined through means of the P and D station monitor 51 described above. When it is determined that the machine 30 is available and that the P and D station 26 or 27 is empty, the CPU commands the S/R machine 30 to retrieve the load 29 from its bay 33 and deposit the load on the P and D station.

The CPU then deletes from the storage inventory file 44 (FIG. 3) those materials which have been retrieved from the high-rise storage warehouse 32 and assigns an out-processing transaction code from the out-processing transaction file 49 to the load 29 which has been set down at the P and D station 26. The out-processing transaction code accompanies the order information keyed in at the operator station 12, including part number, quantity and destination. The computer terminal 14 at the operator station 12 is monitored by the CPU 22 until a request for a move-ticket printout is sent to the CPU from the operator station 12. The move-ticket printout will be requested when a forklift is available to remove the outbound load 29 from the P and D station 26.

Upon receiving a request for a move-ticket printout, the CPU then takes the next out-processing transaction code in sequence in the transaction file 49 and causes the ticket printer 20 (FIG. 1) at the operator station 12 to print a move-ticket. This ticket contains the information in man-readable form associated with the out-processing transaction code keyed in with the order and in addition the particular P and D station 26 or 27 upon which the outbound load 29 is waiting. This move-ticket is then taken by a forklift operator who proceeds to pick up the materials from the station designated on the move-ticket. The CPU then monitors the station 26 or 27 through the P and D station monitor 51 as described above to determine when the load has been picked up. When the load 29 has been removed from the P and D station, the out-processing transaction code is deleted and can be reassigned to another outgoing load of materials.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method of automatically addressing and handling goods in a high-rise storage system utilizing an electronically controlled storage and retrieval (S/R) machine, a central processing unit (CPU), a storage operator station and a storage aisle console, comprising the steps of:
   establishing in the CPU memory a part number file of all goods acceptable for storage;
   establishing in the CPU memory a storage inventory file of all goods actually stored in the high-rise storage system;
   establishing in the CPU memory a transaction file of all goods in transit to or from the high-rise storage system;
   providing a plurality of transaction code numbers which can only be associated with a load of goods at the storage operator station;
   examining the load of goods to be stored and entering a description of the goods into the CPU at the storage operator station;
   verifying the descriptive information entered into the CPU by electronically comparing the descriptive information with the part number file of acceptable goods to determine if the description of the goods is found in the part number file;
   electronically associating a transaction code number with the description of the load only if the description is found in the part number file and thereafter electronically storing the description in the transaction file at an address identifiable by the transaction code number;
   physically associating the transaction code number with the load in a machine-readable form so as to eliminate further human interpretation of the goods to the CPU;
   printing an identification label bearing the descriptive information and associating the printed label with the load of goods;
   removing the labeled goods to a pick up station of the high-rise storage system;
   reading the transaction code number into the aisle console so as to identify the description of the goods to the CPU without human interpretation thereof; and
   transferring the goods to the S/R machine from the pickup station and storing the goods in a CPU-selected location.

2. A method as defined in claim 1 wherein said removing step is followed electronically monitoring the alignment of said labeled goods on the pickup station and wherein said transmitting step is electronically disabled until alignment of the load is effected.

3. A method as defined in claim 1 wherein said step of electronically associating a transaction code number with the description of the load comprises entering a transaction card into a card reader at the storage operator station, the transaction card bearing a transaction code number which will be assigned by the CPU to the corresponding description of the goods only if the description is found in the established part number file.

4. A method as defined in claim 1 wherein said step of reading the transaction code number into the aisle console comprises placing a punched card bearing a transaction code number into a card reader at the storage aisle console so as to transfer the transaction code number to the CPU, thereby identifying the description of the load stored within the transaction file to the CPU.

5. A method as defined in claim 1 wherein said verifying step comprises communicating invalidity of the description of the goods from the CPU to the storage operator station when the description of the goods is not found in the established inventory listing.

6. A method as defined in claim 1 wherein said printing step comprises developing a coded label which includes the transaction code; and wherein said reading step comprises passing the coded label adjacent an optical reader to thereby transmit the label information to the CPU.

7. A method as defined in claim 1 further comprising the steps of:
   entering into the CPU retrieval information from the storage operator station, said retrieval information including an identification of the goods to be retrieved;
   electronically searching the storage inventory file prestored in the CPU for goods meeting the identification entered;
   storing the retrieval information in the transaction file;
   communicating the address of the identified goods from the CPU to the S/R machine and displacing the S/R machine to the address in the high-rise storage;
   retrieving the identified goods from the high-rise storage and placing the goods on the pickup station with the S/R machine;
   printing a label depicting at least a portion of the stored retrieval information and associating the label with the goods at the pickup station; and
   removing the goods from the pickup station.

8. A method as defined in claim 7 wherein said entering step comprises entering the destination of the goods in addition to the identification of the goods and wherein said printing step comprises printing a label depicting the identification of the goods and the destination of the goods.

9. A method as defined in claim 7 wherein said entering step comprises entering a plurality of single orders, each order specifying the identification of goods to be retrieved and further comprising:
   maintaining in the CPU a queue of all orders that have been entered at the storage operator station but not yet delivered by the S/R machine;
   serially selecting a request from the queue for transmission from the CPU to the S/R machine when the S/R machine is ready for a new output command.

10. A method as defined in claim 7 wherein said printing step comprises generating a lable at a location remote from the pickup station of the high-rise storage, the label depicting the identification of the goods and the address of the pickup station upon which the goods have been located.

11. A method of automatically handling goods stored in high-rise storage utilizing a storage-retrieval (S/R) machine, a central processing unit (CPU), a storage operator station remote from the high-rise storage and a storage aisle console near a pickup station of the high-rise storage comprising the steps of:
   compiling a part number file of acceptable inventory codes and electronically storing the file in the CPU memory;
   establishing a transaction file in the CPU memory for all goods in transit to or from the high-rise storage;
   compiling a storage inventory file in the CPU memory of all goods actually stored in the high-rise storage;
   inspecting goods to be stored and entering into the CPU at the storage operator station an identification code representing the identification of the goods;
   accompanying each identification code at the storage operator station with a transaction code;
   electronically comparing the idenntification code with the part number file of acceptable inventory codes and associating the transaction code with the identification code only when the CPU finds an inventory code which corresponds to the entered identification code;
   generating a label for the goods to be stored and associating the label with the goods, the label bearing the transaction code;
   placing the goods at a pickup station of the high-rise storage;
   communicating the transaction code of the goods through the storage aisle console to the CPU;
   automatically directing the S/R machine to remove the goods to the CPU-assigned address;
   entering the description of the goods from the transaction file into the storage inventory file after the goods are stored;
   requesting retrieval of the goods from storage by entering a descriptive code for the goods into the CPU at the storage operator station;
   electronically searching the inventory files until goods in storage matching the identification code of the requested goods is found;
   storing the identification code in the transaction file;
   directing an electronic command from the CPU to the S/R machine so as to transfer the S/R machine to the address of the goods corresponding to the identification code;
   retrieving the goods and depositing the goods at a pickup station;
   printing a label with information comprising at least part of the identification code for the retrieved goods and associating the label with the goods at the pickup station; and
   removing the goods from the pickup station.

12. A materials handling system comprising:
   an array of bays facing onto an aisle, each bay adapted to receive a load of goods;
   a storage-retrieval (S/R) machine displaceable along the aisle adjacent the array of bays;
   a central processing unit (CPU) comprising a storage inventory file of all goods actually stored in the bays, a part number file of all goods acceptable for storage, and a transaction file of all goods in transit to or from the bay;
   a storage operator station for electronically processing all incoming or outgoing goods, said storage operator station comprising:
   a terminal electrically connected to the CPU for transmitting a description of the goods to the CPU so as to enable the CPU to verify the goods from the part number file and thereafter store said description in the transaction file at an address indentifiable by a transaction code number, said terminal also comprising means for electronically associating the transaction code number with the description of the goods; and means for physically associating the transaction code number in machine-readable form with the load of goods so as to thereafter eliminate the need for further manually programming the description of the goods into the CPU;

at least one pickup and deposit station situated near the aisle so as to make the pickup and deposit station accessible by the S/R machine; and a storage aisle console electrically connected to the CPU and the S/R machine for directing the S/R machine in response to commands from the CPU so as to cause the S/R machine to remove the goods from the pickup and deposit station and thereafter store them in a selected bay only after the machine-readable transaction number has been entered into the storage aisle console so as to identify the description of the goods at the pickup and deposit station to the CPU.

13. A materials handling system as defined in claim 12 wherein said pickup and deposit station comprises means for ascertaining the alignment of the load of material and means for inhibiting the S/R machine from picking up the load when the load is misaligned.

14. A materials handling system as defined in claim 12 wherein said storage aisle console comprises a card reader for accepting a transaction code number in the form of a punched card.

15. A materials handling system as defined in claim 12 wherein said storage aisle console comprises an electronic bar-code reader for accepting a transaction code number in bar-code form.

16. A materials handling system as defined in claim 12 wherein said CPU comprises means for comparing the description information entered from the operator station terminal with the part number file of acceptable goods, and means inhibiting association of the transaction code number with any load of material, the description of which is not found in the part number file.

17. A materials handling system as defined in claim 12 wherein said means for physically associating the transaction code with the load of goods comprises means for copying the transaction code in machine-readable form on a ticket and labeling the electronic data bit representation of the described load of materials with the transaction code.

18. A materials handling system as defined in claim 12 wherein said means for physically associating the transaction code with the load of goods comprises means for reading an encoded transaction ticket and labeling the described load of materials with the transaction code.

19. A materials handling system as defined in claim 12 further comprising means for printing a report including at least a portion of the information stored in the CPU memory.

20. A materials handling system as defined in claim 12 wherein said storage operator station further comprises means for electronically accumulating requests to the CPU for retrieval of material and means for sequentially printing a move-ticket describing the load of materials placed upon the pickup and deposit station by the S/R machine.

* * * * *

UNITED STATES PATENT AND TRADEMARK OFFICE
CERTIFICATE OF CORRECTION

PATENT NO. : 4,074,120
DATED : February 14, 1978
INVENTOR(S) : James Kenneth Allred, et al It is certified that error appears in the above-identified patent and that said Letters Patent are hereby corrected as shown below:

Column 1, line 16, "storge" should be --storage--

Column 5, line 1, "deposite" should be --deposit--

Column 5, line 24, "one" should be --One--

Column 6, line 2, "deposite" should be --deposit--

Column 6, line 23, "is" (second occurrence) should read -- in --

Column 9, line 11, "CRt" should be --CRT--

Column 10 (claim 2), line 53 after "followed" insert --by--

Column 12 (claim 11), line 12, "idenntification" should be --identification--.

Signed and Sealed this

Eleventh Day of July 1978

[SEAL]

Attest:

RUTH C. MASON
Attesting Officer

DONALD W. BANNER
Commissioner of Patents and Trademarks